US012000762B2

(12) United States Patent
Krueger et al.

(10) Patent No.: US 12,000,762 B2
(45) Date of Patent: *Jun. 4, 2024

(54) SYSTEMS AND METHODS FOR CONFINING BALLAST SAMPLES

(71) Applicant: BNSF Railway Company, Fort Worth, TX (US)

(72) Inventors: Darrell R. Krueger, Lawrence, KS (US); Michael A. Wnek, Lawrence, KS (US); William Dombrow, Topeka, KS (US)

(73) Assignee: BNSF Railway Company, Fort Worth, TX (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/534,961

(22) Filed: Nov. 24, 2021

(65) Prior Publication Data

US 2022/0082475 A1 Mar. 17, 2022

Related U.S. Application Data

(63) Continuation of application No. 16/581,915, filed on Sep. 25, 2019, now Pat. No. 11,199,478.

(51) Int. Cl.
*G01N 1/08* (2006.01)
*E01B 27/04* (2006.01)
(Continued)

(52) U.S. Cl.
CPC ............. *G01N 1/08* (2013.01); *E01B 27/04* (2013.01); *E01B 37/00* (2013.01); *E01B 27/00* (2013.01); *E01B 2203/028* (2013.01)

(58) Field of Classification Search
CPC ... G01N 1/02; G01N 1/04; G01N 1/08; E01B 27/00; E01B 27/04; E01B 37/00; E01B 2203/02; E01B 2203/028
See application file for complete search history.

(56) References Cited

U.S. PATENT DOCUMENTS 2,534,880 A 12/1950 Praytor et al.
2,911,734 A 11/1959 Sublett et al.
(Continued)

FOREIGN PATENT DOCUMENTS

CN 108663232 A * 10/2018 ............... G01N 1/08
EP 0096431 A2 12/1983
(Continued)

OTHER PUBLICATIONS

Patent Cooperation Treaty, Search Report and Written Opinion, International Application No. PCT/US2020/048676, dated Oct. 20, 2020.

*Primary Examiner* — Benjamin R Schmitt

(74) *Attorney, Agent, or Firm* — Whitaker Chalk Swindle & Schwartz, PLLC; Enrique Sanchez, Jr.; Bradley J. Birchfield

(57) ABSTRACT

A sample confinement tool includes a first end and a second end. The first end of the sample confinement tool is coupled to a driving tool. The driving tool is coupled to a heavy-duty vehicle. The sample confinement tool is operable to insert a predetermined depth below a ballast surface and collect a ballast sample within the second end of the sample confinement tool. The sample confinement tool is also operable to confine the ballast sample within the second end of the sample confinement tool by mechanically compressing the ballast sample. The sample confinement tool is further operable to release the ballast sample into a sample receptacle by mechanically decompressing the ballast sample.

20 Claims, 5 Drawing Sheets

(51) Int. Cl.
   *E01B 37/00*     (2006.01)
   *E01B 27/00*     (2006.01)

(56) References Cited

U.S. PATENT DOCUMENTS

| | | |
|---|---|---|
| 3,179,186 A | 4/1965 | Bull et al. |
| 3,394,766 A | 7/1968 | LeBelle |
| 3,436,848 A | 4/1969 | Peppin et al. |
| 4,108,076 A | 8/1978 | Knape |
| 4,393,691 A | 7/1983 | Koehne |
| 4,850,123 A | 7/1989 | Whitaker, Jr. |
| 4,882,860 A | 11/1989 | Whitaker, Jr. |
| 4,953,637 A | 9/1990 | Starr et al. |
| 5,058,688 A | 10/1991 | Scott et al. |
| 5,209,129 A | 5/1993 | Jaselskis et al. |
| 5,950,741 A | 9/1999 | Wright et al. |
| RE37,066 E | 2/2001 | Casey et al. |
| 6,318,193 B1 | 11/2001 | Brock et al. |
| 6,505,696 B1 | 1/2003 | Looijen et al. |
| 7,182,155 B2 | 2/2007 | Lange |

FOREIGN PATENT DOCUMENTS

| | | |
|---|---|---|
| JP | S6347402 A | 2/1988 |
| JP | 3016402 U | 10/1995 |
| JP | H08226117 B2 | 9/1996 |
| JP | 2000227388 A | 8/2000 |
| JP | 2003003454 A | 1/2003 |
| JP | 2006105730 A | 4/2006 |
| SE | 515758 C2 | 10/2001 |

\* cited by examiner

SYSTEMS AND METHODS FOR CONFINING BALLAST SAMPLES

TECHNICAL FIELD

This disclosure generally relates to confining samples, and more specifically to systems and methods for confining ballast samples.

BACKGROUND

In railway transportation systems, railway track is typically supported by crushed rock known as ballast. Over time, ballast degrades and should be replaced. To evaluate the state of ballast degradation, samples of the ballast are collected and analyzed. Traditional methods for collecting ballast, such as hand digging pits for sample excavation, may disturb the ballast surrounding the sample and expose the sample to contamination.

SUMMARY

According to an embodiment, a sample confinement tool includes a first end and a second end. The first end of the sample confinement tool is coupled to a driving tool. The driving tool is coupled to a heavy-duty vehicle. The sample confinement tool is operable to insert a predetermined depth below a ballast surface and collect a ballast sample within the second end of the sample confinement tool. The sample confinement tool is also operable to confine the ballast sample within the second end of the sample confinement tool by mechanically compressing the ballast sample. The sample confinement tool is further operable to release the ballast sample into a sample receptacle by mechanically decompressing the ballast sample.

The sample confinement tool may include a first steel member and a second steel member coupled to the first steel member. A portion of the second steel member overlaps the first steel member. The sample confinement tool may include a hydraulic actuator that is operable to rotate the second steel member in a first direction relative to the first steel member to mechanically compress the ballast sample and/or rotate the second steel member in a second direction relative to the first steel member to mechanically decompress the ballast sample.

In certain embodiments, the sample confinement tool is a hollow square tube that is approximately four feet in length, approximately eight inches in depth, and approximately eight inches in width. The sample confinement tool may be coupled to one or more hydraulic lines. The one or more hydraulic lines may be coupled to a hydraulic circuit of the heavy-duty vehicle. Inserting the sample confinement tool the predetermined depth below the ballast surface may include vibrating, using the driving tool, the sample confinement tool until the second end of the sample confinement tool reaches the predetermined depth below the ballast surface. In certain embodiments, the heavy-duty vehicle is a backhoe, the driving tool is a vibrating tool, and/or the ballast surface is a bed of a railroad track.

According to another embodiment a method includes inserting a sample confinement tool a predetermined depth below a ballast surface. The sample confinement tool includes a first end and second end. The method also includes collecting a ballast sample within the second end of the sample confinement tool and confining the ballast sample within the second end of the sample confinement tool by mechanically compressing the ballast sample. The method further includes releasing the ballast sample into a sample receptacle by mechanically decompressing the ballast sample.

The method may include rotating, using a hydraulic actuator, a second steel member of the sample confinement tool in a first direction relative to a first steel member of the sample confinement tool to mechanically compress the ballast sample. The method may include rotating, using the hydraulic actuator, the second steel member in a second direction relative to the first steel member to mechanically decompress the ballast sample. The method may include coupling one or more hydraulic lines to the sample confinement tool and to a hydraulic circuit of a heavy-duty vehicle. Inserting the sample confinement tool the predetermined depth below the ballast surface may include vibrating, using a driving tool, the sample confinement tool until the second end of the sample confinement tool reaches the predetermined depth below the ballast surface. The sample confinement tool may be a hollow square tube that is approximately four feet in length, approximately eight inches in depth, and approximately eight inches in width.

Technical advantages of certain embodiments of this disclosure may include one or more of the following. The sample confinement tool described herein may improve sample uniformity, reduce contamination, reduce disturbance surrounding the sample, improve operator safety, and reduce the time required to extract a sample. In certain embodiments, the walls of the sample confinement tool contain the sample, which may improve sample uniformity and reduce contamination of the sample by preventing ballast external to the sample confinement tool from falling into the sample area. Methods of certain embodiments described herein may improve sample uniformity by controlling the depth and area of the sample. The sample confinement tool is attached to a high visibility vehicle, which may improve operator safety. The time required to extract a sample using the sample confinement tool may be reduced clue to productivity gains. Methods of certain embodiments described herein may reduce the number of workers on a railroad track since the sample confinement tool is mechanically operated.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Certain known methods for collecting samples are specifically designed for soils, which have small particles and thus have small sample sections. These known sampling methods are designed to take advantage of the soil's natural cohesion, which keeps the sample intact during extraction. Other methods for collecting samples utilize core drills to sample layers of rock. The core is uniformly extracted due to the solidity of the rock, which enables the core to stay intact. Ballast, such as railway ballast, has a different consistency than soil or rock. Ballast may include large (i.e., one to two and a half inches) rock particles. Existing soil sampling equipment does not have sufficient capacity to extract a ballast sample of appropriate volume (e.g., a cubic foot of ballast). Unlike soil and rock, ballast does not have a natural cohesion to hold the sample intact during extraction.

This disclosure describes systems, methods, and tools for confining ballast samples. A mechanical sampling system described herein extracts ballast samples from a railway track. The system includes a sample confinement tool that is driven into the ballast. The sample confinement tool includes jaw-like members that contract at a pre-determined depth below the ballast surface to secure the ballast sample. The sample confinement tool is withdrawn from the ballast and moved to a position over a sample receptacle. The jaw-like members of the sample confinement tool retract to release the ballast sample into the sample receptacle. As such, the systems and methods for confining ballast samples described herein improve ballast sample uniformity, reduce contamination of the ballast sample, reduce disturbance surrounding the ballast sample, improve operator safety, and reduce the time required to extract the ballast sample as compared to traditional sampling systems and methods.

Figure 1:
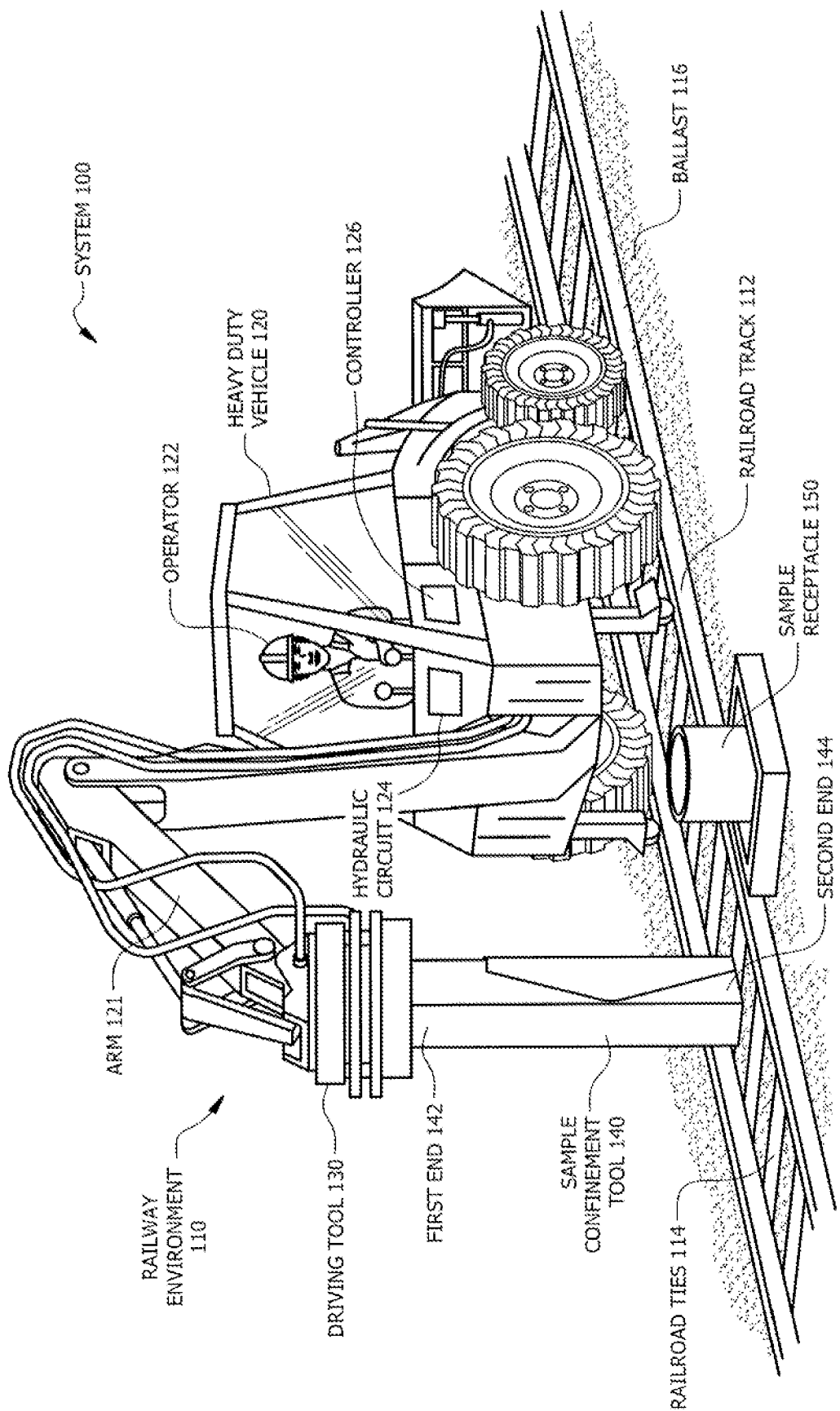
FIG. 1 illustrates an example system for confining a ballast sample.
Figure 2:
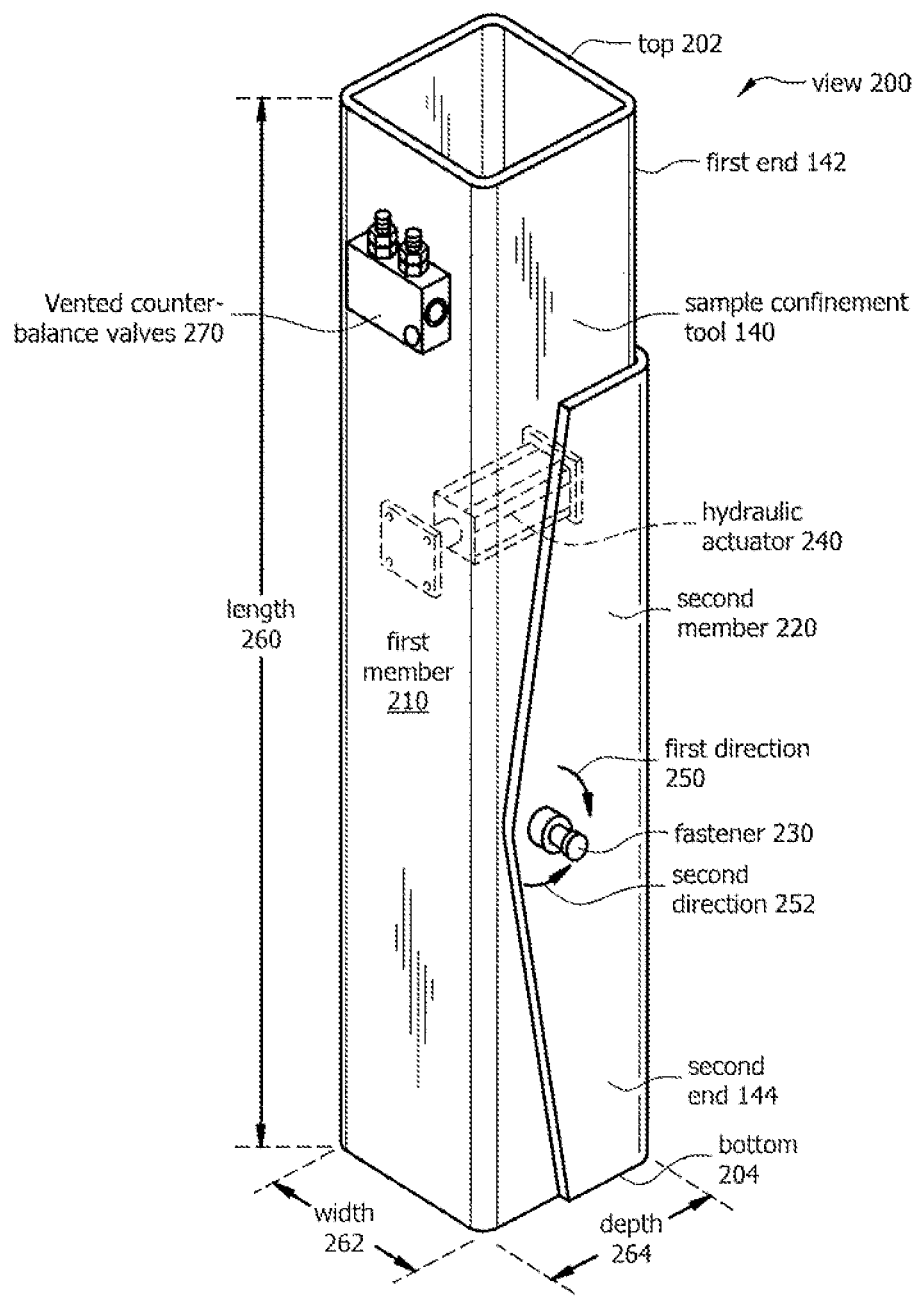
FIG. 2 illustrates an example perspective view of the sample confinement tool used in the system of FIG. 1.
Figure 3:
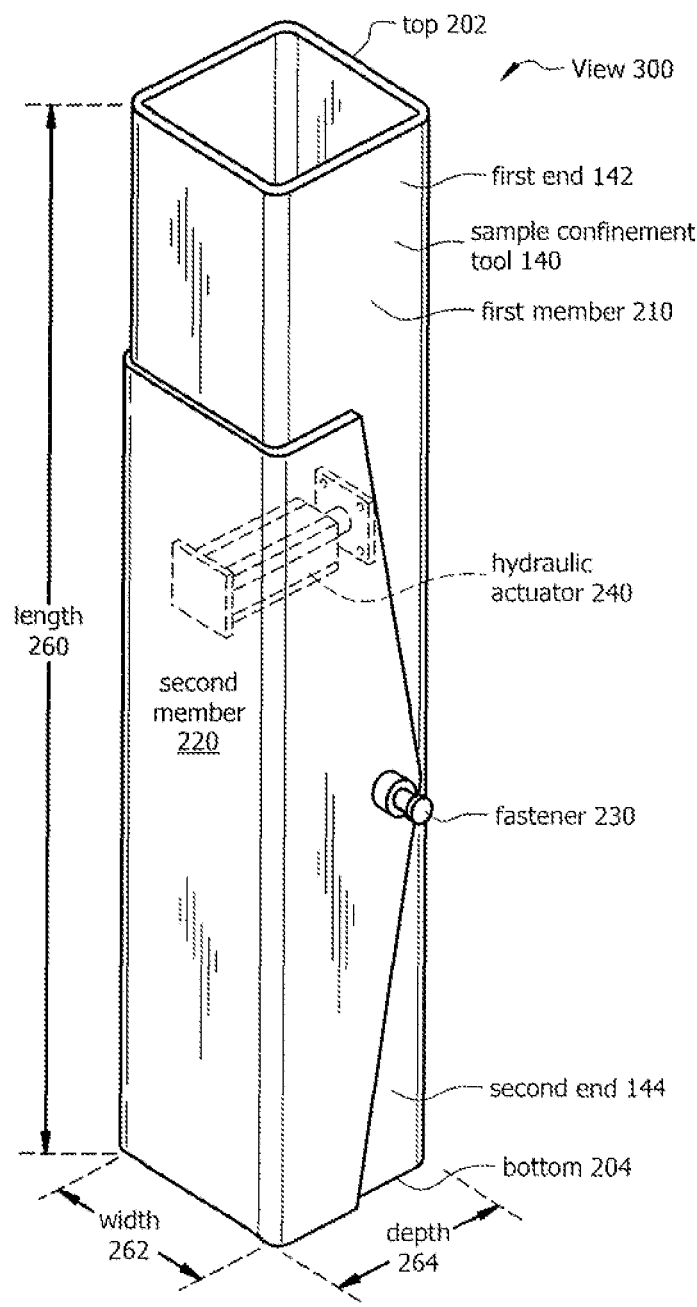
FIG. 3 illustrates another example perspective view of the sample confinement tool of FIG. 1.
Figure 4:
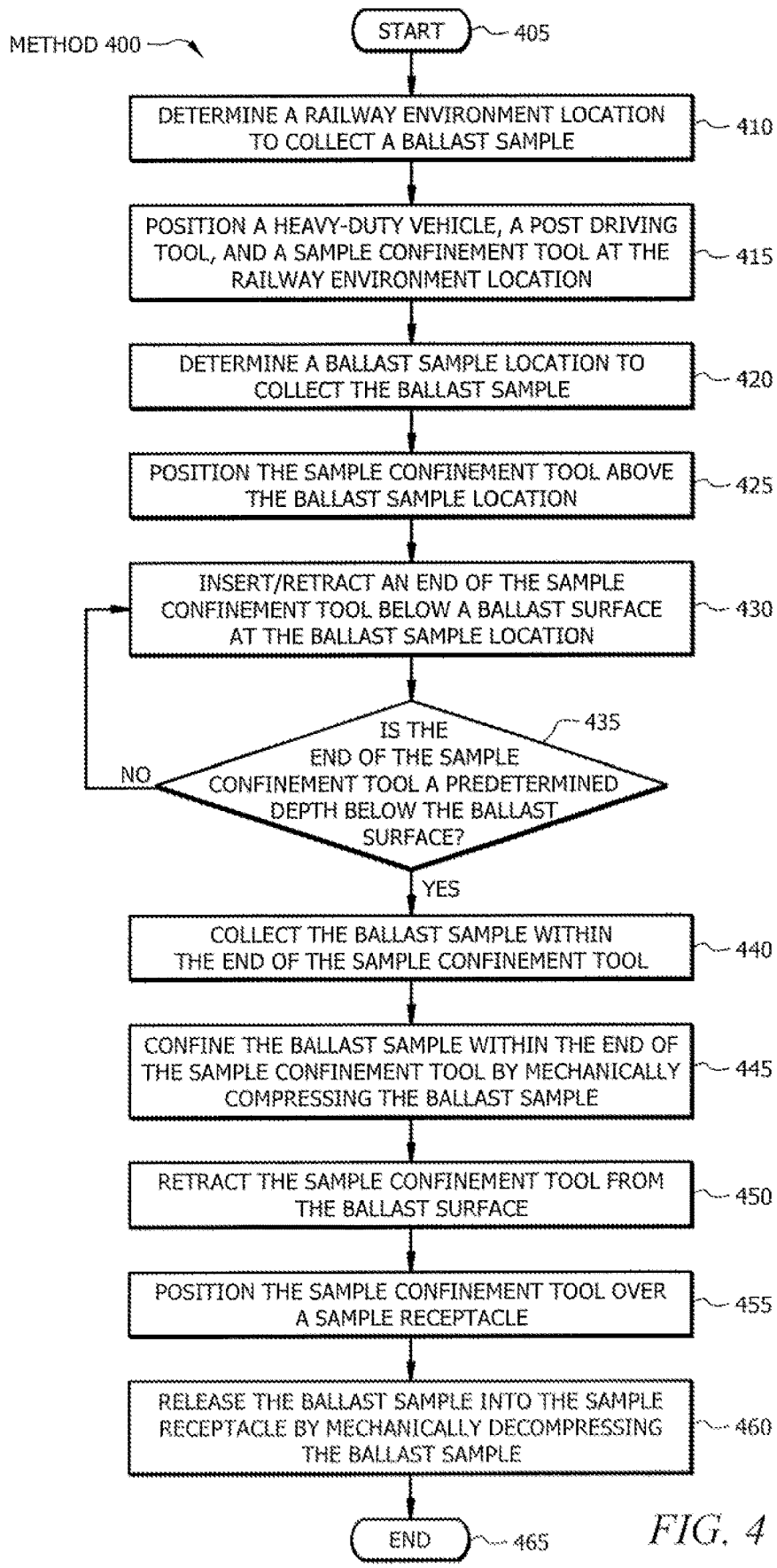
FIG. 4 illustrates an example method for confining a ballast sample.
Figure 5:
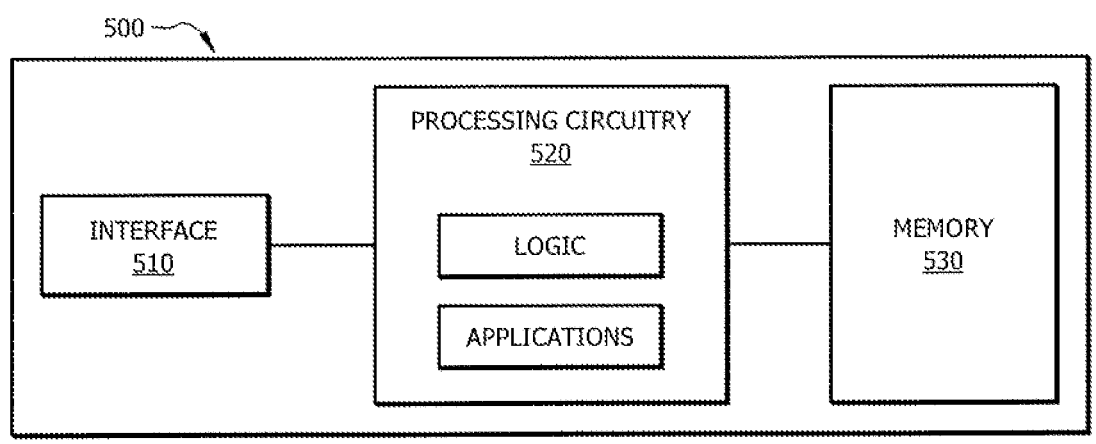
FIG. 5 illustrates an example computer system that may be used by the systems and methods described herein.

FIGS. 1 through 5 show example systems and methods for confining ballast samples. FIG. 1 shows an example system for confining a ballast sample. FIGS. 2 and 3 show example perspective views of the sample confinement tool used in the system of FIG. 1. FIG. 4 shows an example method for confining a ballast sample. FIG. 5 shows an example computer system that may be used by the systems and methods described herein.

FIG. 1 illustrates an example system 100 for confining a ballast sample. System 100 of FIG. 1 includes a railway environment 110, a heavy-duty vehicle 120, a driving tool 130, and a sample confinement tool 140. System 100 or portions thereof may be associated with an entity, which may include any entity, such as a business, a company (e.g., a railway company, a transportation company, etc.), or a government agency (e.g., a department of transportation, a department of public safety, etc.). The elements of system 100 may be implemented using any suitable combination of hardware, firmware, and software. For example, the elements of system 100 may be implemented using one or more components of the computer system of FIG. 5.

Railway environment 110 represents a physical area encompassing one or more railroad components. In the illustrated embodiment of FIG. 1, railway environment 110 includes railroad tracks 112, railroad ties 114, and ballast 116. Railroad tracks 112 include a pair of steel rails, railroad ties 114, and ballast 116. The pair of steel rails are separated and supported with railroad ties 114. Railroad ties 114 may be made of wood, concrete, or any other suitable material. Ballast 116 is a bed of crushed rock upon which railroad ties 114 are laid. Ballast 116 may be used to support the load exerted on railroad ties 114, to facilitate water drainage, to suppress vegetation that may interfere with the structure of railroad tracks 112, to prevent railroad tracks 112 from shifting due to loads exerted by moving trains, and the like. Ballast 116 may include crushed stone (e.g., crushed granite, gneiss, and/or basalt), burnt clay, or any other suitable material. Ballast 116 may be packed between the rails and railroad ties 114, underneath the rails and railroad ties 114, and/or around the rails and railroad ties 114. Ballast 116 may form the uppermost layer of the railway bed. Ballast 116 may be formed upon a layer of soil. Ballast 116 may be any suitable thickness. For example, ballast 116 may have a thickness ranging from six inches to twenty inches.

Heavy-duty vehicle 120 is any vehicle that provides an attachment for driving tool 130. Heavy-duty vehicle 120 may be a construction vehicle such as a mechanical excavator (e.g., a backhoe), a bulldozer, a front loader, a dump truck, and the like. Heavy-duty vehicle 120 may be designed specifically for railroad work. For example, heavy-duty vehicle 120 may be equipped such that it can be driven along the rails of railroad tracks 112. In certain embodiments, heavy-duty vehicle 120 includes an arm 121 (e.g., a boom) that extends and/or rotates in one or more directions. Arm 121 of heavy-duty vehicle 120 may pivot and/or rotate about one or more axes. Arm 121 may be mechanically controlled by an operator 122 of heavy-duty vehicle 120.

Operator 122 of heavy-duty vehicle 120 is any person (e.g., a technician, an engineer, a driver, a vehicle operator, etc.) or machine that controls one or more operations of heavy-duty vehicle 120. In certain embodiments, operator 122 controls one or more operations of one or more components (e.g., driving tool 130 and/or sample confinement tool 130) attached to heavy-duty vehicle 120. Operator 122 may drive heavy-duty vehicle 120 along the rails of railroad tracks 112. Operator 122 may control the location of one or more portions of arm 121 of heavy-duty vehicle 120, driving tool 130, and/or sample confinement tool 140.

Heavy-duty vehicle 120 may include a hydraulic circuit 124. Hydraulic circuit 124 is any component that can control the delivery of hydraulic fluid to one or more other components of system 100. Hydraulic circuit 124 may include one or more hydraulic pumps, one or more valves (e.g., control valves, over-load relief vales, etc.), one or more motors, and the like. Hydraulic circuit 124 may be coupled to a hydraulic actuator (e.g., hydraulic actuator 240 of FIGS. 2 and 3 below) of sample confinement tool 140 using one or more lines (e.g., tubes, cables, and the like.)

Heavy-duty vehicle 120 may include one or more controllers 126. Controller 126 of system 100 represents any suitable computing component that may be used to process information for system 100. Controller 126 may coordinate one or more components of system 100 and/or facilitate communication between one or more components of system 100. Controller 126 may receive data (e.g., sensor data) from and/or transmit data to one or more components of system 100. Controller 126 may initiate the movement of arm 121 of heavy-duty vehicle 120, driving tool 130, and/or sample confinement tool 140.

Controller 140 may include a communications function that allows users (e.g., a technician, an administrator, operator 122, etc.) to communicate with one or more components of system 100 directly. For example, controller 126 may be part of a computer (e.g., a laptop computer, a desktop computer, a smartphone, a tablet, etc.), and a user (e.g., operator 122) may access controller 126 through an interface (e.g., a screen, a graphical user interface (GUI), or a panel) of the computer. Controller 126 may communicate with one or more components of system 100 via a network. While controller 126 is located inside heavy-duty vehicle 120 in the illustrated embodiment of FIG. 1, controller 126 may be located in any suitable location to process information for system 100. For example, controller 126 may be located within sample confinement tool 140, in a cloud computing environment, and the like.

Controller 126 may receive data from one or more components of system 100 and performs actions based on the received data. In certain embodiments, controller 126 receives pressure data from a pressure sensor of sample confinement tool 140 and initiates an increase or decrease in pressure based on the received pressure data. For example, controller 126 may receive pressure data indicating that the pressure of the ballast sample confined within sample confinement tool 140 is less than 2000 pounds per square inch (psi) and increase the pressure until the pressure data indicates that the pressure of the confined ballast sample has reached 2000 psi. In certain embodiments, controller 126 receives location data from a sensor (e.g., a Global Positioning System (GPS) sensor) of sample confinement tool 140 and initiates a change in location of sample confinement tool 140 in response to receiving the location data. For example, controller 126 may receive location data indicating that an end of sample confinement tool 140 is less than eighteen inches below the surface of ballast 116 and initiate the driving of sample confinement tool 140 into the ballast until the location data indicates that the end of sample confinement tool 140 is eighteen inches below the surface of ballast 116.

Driving tool 130 is any component that can be used to drive sample confinement tool 140 into ballast 116. For example, driving tool 130 may apply pressure to sample confinement tool 140 to drive sample confinement tool 140 into ballast 116. The applied pressure may include a downward force (i.e., a force applied toward ballast 116), a vibration force, a combination thereof, and the like. Driving tool 130 may be a post driving tool, a hydraulic tool, a vibrating tool, a combination thereof, or any other suitable component for driving sample confinement tool 140 into ballast 116. In certain embodiments, driving tool 130 is a vibratory post driver. Driving tool 130 attaches to heavy-duty vehicle 120 and sample confinement tool 140. Driving tool 130 may include one or more mounting brackets that mount to arm 121 of heavy-duty vehicle 120. Driving tool 130 may include an adapter (e.g., a cup) that attaches to (e.g., grips) sample confinement tool 140.

Sample confinement tool 140 is any component that can mechanically confine a ballast sample. Sample confinement tool 140 has a first end 142 and a second end 144. First end 142 of sample confinement tool 140 attaches to driving tool 130. In certain embodiments, sample confinement tool 140 is inserted a predetermined depth below a surface of ballast 116. For example, operator 122 of heavy-duty vehicle 120 may activate driving tool 130, and driving tool 130 may drive second end 144 of sample confinement tool 140 the predetermined depth below the surface of ballast 116. The predetermined depth may range from six inches to twenty inches. For example, the predetermined depth may be eighteen inches.

In certain embodiments, sample confinement tool 140 has outer walls that form a hollow core for collecting a sample of ballast 116. For example, sample confinement tool 140 may include four oak walls that form a hollow tube for collecting the sample of ballast 116. As sample confinement tool 140 is driven into ballast 116, a sample of ballast 116 is contained within the outer walls of sample confinement tool 140. The outer walls of sample confinement tool 140 separate the ballast sample from ballast 116 surrounding the ballast sample, which may prevent contamination of the ballast sample.

In certain embodiments, sample confinement tool 140 confines the ballast sample within second end 144 of sample confinement tool 140. For example, the outer walls of sample confinement tool 140 may mechanically retract, thereby compressing the ballast sample to confine the ballast sample within the second end 144 of sample confinement tool 140. In certain embodiments, the confined ballast sample is one cubic foot in volume. Sample confinement tool 140 may be retracted from ballast 116 once the ballast sample is confined within second end 144 of sample confinement tool 140. Operator 122 of heavy-duty vehicle 120 may initiate the retraction of sample confinement tool 140 from ballast 116.

In certain embodiments, sample confinement tool 140 releases the ballast sample that is confined within second end 144 of sample confinement tool 140. For example, the outer walls of sample confinement tool 140 may mechanically contract, thereby decompressing the ballast sample and releasing the ballast sample from second end 144 of sample confinement tool 140. Sample confinement tool 140 may be positioned above sample receptacle 150 such that the sample of ballast 116 is released within sample receptacle 150. Sample receptacle 150 is any container (e.g., a can, a bucket, a jar, and the like) that can receive the ballast sample. While sample receptacle 150 is illustrated in FIG. 1 as being located adjacent to the outside of the rails of railroad track 112, sample receptacle 150 may be placed at any location within railway environment 110 that is accessible to sample confinement tool 140. Sample confinement tool 140 may be made of steel, aluminum, or any other suitable material. Sample confinement tool 140 may be any suitable size and shape. Sample confinement tool 140 is described in more detail in FIGS. 2 and 3 below.

In operation, a location for taking a sample of ballast 116 is determined within railway environment 110. The ballast sample location may be between two railroad ties 114 of railroad track 112. Heavy-duty vehicle 120 (e.g., a backhoe) is positioned near the ballast sample location. Driving tool 130 (e.g., a vibratory post driver) is attached to heavy-duty vehicle 120, and first end 142 of sample confinement tool 140 is attached to driving tool 130. Operator 122 of heavy-duty vehicle 120 maneuvers arm 121 of heavy-duty vehicle 120 to position sample confinement tool 140 over the ballast sample location. Operator 122 of heavy-duty vehicle 120 activates driving tool 130 to drive second end 144 of sample confinement tool 140 a predetermined depth below a surface of ballast 116 at the ballast sample location. Sample confinement tool 140 collects the ballast sample within second end 144 of sample confinement tool 140. Operator 122 of heavy-duty vehicle 120 retracts the outer walls of sample confinement tool 140 to confine the ballast sample within second end 144 of sample confinement tool 140. Operator 122 then retracts sample confinement tool 130 from ballast 116 and maneuvers arm 121 of heavy-duty vehicle 120 to position the confined ballast sample over sample receptacle 150. Operator 122 contracts the outer walls of sample confinement tool 140 to release the ballast sample into sample receptacle 150. As such, system 100 may be used to confine ballast samples within sample confinement tool 140, which may improve ballast sample uniformity and reduce contamination of the ballast sample.

Although FIG. 1 illustrates a particular arrangement of heavy-duty vehicle 120, arm 121, hydraulic circuit 124, controller 126, driving tool 130, sample confinement tool 140, and sample receptacle 150 within railway environment 110, this disclosure contemplates any suitable arrangement of heavy-duty vehicle 120, arm 121, hydraulic circuit 124, controller 126, driving tool 130, sample confinement tool 140, and sample receptacle 150 within railway environment 110. For example, sample receptacle may be located between the rails of railroad tracks 112. As another example, controller 126 may be located within sample confinement tool 140.

Although FIG. 1 illustrates a particular number of heavy-duty vehicles 120, arms 121, hydraulic circuits 124, controllers 126, driving tools 130, sample confinement tools 140, and sample receptacles 150, this disclosure contemplates any suitable number of heavy-duty vehicles 120, arms 121, hydraulic circuits 124, controllers 126, driving tools 130, sample confinement tools 140, and sample receptacles 150. For example, more than one driving tool 130 and/or sample confinement tool 140 may be attached to heavy-duty vehicle 120. As another example, heavy-duty vehicle 120, driving tool 130, and sample confinement tool 140 may each include one or more controllers 126. Modifications, additions, or omissions may be made to system 100 depicted in FIG. 1. System 100 may include more, fewer, or other components. One or more components of system 100 may include one or more elements from the computer system of FIG. 5.

FIGS. 2 and 3 illustrate example perspective views 200 and 300, respectively, of sample confinement tool 140 of FIG. 1. Specifically, FIG. 2 illustrates perspective view 200 of sample confinement tool 140, and FIG. 3 illustrates perspective view 300 of sample confinement tool 140 rotated 180 degrees along the longitudinal axis of sample confinement tool 140 from perspective view 200 of FIG. 2. One or more portions of sample confinement tool 140 may be made of metal (e.g., (e.g., stainless steel), aluminum, nickel, titanium, copper, iron, steel, etc.), plastic, fabric, a combination thereof, or any other suitable material. Sample confinement tool 140 may be made of a material that can withstand sun, rain, hail, wind, snow, ice, sleet, and/or other weather conditions. As described above in FIG. 1, sample confinement tool 140 is used to confine ballast samples. Sample confinement tool 140 of FIGS. 2 and 3 include first end 142, second end 144, a first member 210, a second member 220, a fastener 230, a hydraulic actuator 240, and vented counterbalance valves 270.

First end 142 of sample confinement tool 140 represents any portion of sample confinement tool from a midpoint of length 260 of sample confinement tool 140 to top 202 of sample confinement tool 140. First end 142 of sample confinement tool 140 couples to driving tool 130 of FIG. 1. For example, first end 142 of sample confinement tool 140 may physically connect to sample confinement tool 140 using friction, pressure, one or more fasteners (e.g., bolts, screws, nails, and the like), or a combination thereof.

Second end 144 of sample confinement tool 140 represents any portion of sample confinement tool from a midpoint of length 260 of sample confinement tool 140 to bottom 204 of sample confinement tool 140. Second end 144 of sample confinement tool may receive a ballast sample. For example, second end 144 of sample confinement tool 140 may be driven below a ballast surface such that the hollow core of second end 144 is filled with ballast.

First member 210 of sample confinement tool 140 is a physical component that extends the entire length 260 of sample confinement tool 140. In the illustrated embodiment of FIGS. 2 and 3, first member 210 forms a square shape at top 202 of first end 142 and a "C" shape at bottom 204 of second end 144. The square shape at top 202 of first end 142 is formed with four thin walls joined at the edges. Each wall of first member 210 may be approximately (i.e., within ten percent) one-half inches in thickness. The edges of the square shape al top 202 may be rounded. In certain embodiments, length 260 of first member 210 is approximately four feet, width 262 of first member 210 at top 202 of first end 142 is approximately eight inches, and depth 264 of first member 210 at top 202 of first end 142 is approximately eight inches. The hollow tube formed by first member 210 may extend approximately one loot from top 202 of first end 142. The "SC" shape formed by first member 210 may extend approximately three feel from bottom 204 of second end 144. In certain embodiments, width 262 of first member 210 at bottom 204 of second end 144 is approximately eight inches. The depth of each flange of first member 210 at bottom 204 of first end 142 is approximately six inches.

Second member 220 of sample confinement tool 140 is a physical component that has a length of approximately three feet. Second member 220 extends approximately three feet from bottom 204 of second end 144 of sample confinement tool 140. In the illustrated embodiment of FIGS. 2 and 3, second member 210 forms a "C" shape at both ends of second member 210. The "C" shape is formed with three thin walls joined at the edges. Each wall of second member 220 may be approximately one-half inches in thickness. The edges of the "C" shape of second member 220 may be rounded. Width 262 of second member 220 is approximately eight inches. The depth of each flange at each end of second member 220 is approximately four inches. The depth of each flange of second member 220 varies along the length of second member 220. The depth of each flange of second member 220 at the midpoint of the length of second member 220 is approximately six and one-fourth inches. This depth at the midpoint of the length of second member 220 extends two and a half inches along the length of second member 220. As illustrated in FIGS. 2 and 3, the depth of second member 220 slopes from each end of this length to each end of second member 220. In the illustrated embodiment, the slope is constant. In certain embodiments, the slop may vary along the length.

In the illustrated embodiments of FIGS. 2 and 3, the flanges of second member 220 overlap the flanges of first member 210. Each flange of second member 220 fastens to each corresponding flange of first member 210 by fastener 230. Fastener 230 is any suitable component for joining second member 220 to first member 210. Fastener 230 may be a bolt, a screw, a nail, a pin, and the like. In the illustrated embodiment of FIGS. 2 and 3, fastener 230 is located at the midpoint of the length of second member 220, which is approximately one and a half feet from bottom 204 of second end 144. Fastener 230 allows for the rotation of second member 220 relative to first member 210.

Hydraulic actuator 240 of sample confinement tool 140, as illustrated in perspective views 200 and 300 of FIGS. 2 and 3, is any physical component that controls the movement of second member 220 relative to first member 210. Hydraulic actuator 240 may include a cylinder that uses hydraulic power to initiate mechanical motion. In certain embodiments, hydraulic actuator 240 is a hollow cylindrical tube. In the illustrated embodiment of FIGS. 2 and 3, hydraulic actuator 240 is located within the hollow core of sample confinement tool 140. After sample confinement tool 140 collects a ballast sample within the hollow core of second end 144, hydraulic actuator 240 may be activated to exert a pressure on the collected ballast sample. For example, hydraulic actuator 240 may exert a pressure that rotates second member 220 in a first direction 250 relative to first member 210, which mechanically compresses the ballast sample. In the illustrated embodiment of FIG. 2, first direction 250 is a clockwise direction. Second member 220 rotates clockwise relative to first member 210 by pivoting about the axis of fastener 230. The rotation in first direction 250 of second member 220 relative to first member 210 decreases depth 264 of bottom 204 of second end 144. The compression of the ballast sample confines the ballast sample within second end 144 of sample confinement tool 140.

Hydraulic actuator 240 may be deactivated to release the pressure on the ballast sample. For example, the hydraulic actuator 240 may exert a pressure that rotates second member 220 in a second direction 252 relative to first member 210, which mechanically decompresses the ballast sample. In the illustrated embodiment of FIG. 2, second direction 252 is a counterclockwise direction. Second member 220 rotates counterclockwise relative to first member 210 by pivoting about the axis of fastener 230. The rotation in second direction 252 of second member 220 relative to first member 210 increases depth 264 of bottom 204 of second end 144. The decompression of the ballast sample may release the ballast sample from second end 144 of sample confinement tool 140.

Vented counterbalance valves 270 of FIGS. 2 and 3 control the flow from hydraulic actuator 240. For example, venter counterbalance valves 270 may control an overrunning load. Vented counterbalance valves 270 may include an inlet port, an outlet port, and a pilot port. A check valve of vented counterbalance valves 270 may allow free flow from the outlet port (e.g., a directional valve) to the inlet port (e.g., the load.) A direct-acting, pilot assisted relieve valve may control the flow from the inlet port to the outlet port. A pilot assist at the pilot port may lower an effective setting of the relief valve at a rate determined by the pilot ratio.

Although FIGS. 2 and 3 illustrate a particular arrangement of first member 210, second member 220, fastener 230, and hydraulic actuator 240, this disclosure contemplates any suitable arrangement of first member 210, second member 220, fastener 230, and hydraulic actuator 240. For example, in certain embodiments, the flanges of first member 220 may overlap the flanges of second member 210 such that the flanges of second member 210 are inside the flanges of first member 210.

Although FIGS. 2 and 3 illustrate a particular number of first members 210, second members 220, fasteners 230, and hydraulic actuators 240, this disclosure contemplates any suitable number of first members 210, second members 220, fasteners 230, and hydraulic actuators 240. For example, first member 210 and second member 220 may be joined by more than two fasteners 230. As another example, sample confinement tool 140 may include a third member, such as an interchangeable tip for first member 210.

Modifications, additions, or omissions may be made to perspective view 200 and/or perspective view 300 depicted in FIGS. 2 and 3. For example, sample confinement tool 140 may have a length greater than or less than four feet, a width greater than or less than eight inches, and a depth greater than or less than eight inches. As another example, second member 220 may have a length greater than or less than three feet. As still another example, fastener 230 may be located at a position other than the midpoint of the length of second member 220. As still another example, each wall of first member 210 and/or second member 220 may be greater than or less than one-half inches thick (e.g., one-fourth inches thick or three-fourths inches thick). As yet another example, one or more walls of first member 210 and/or second member 220 may have a different thickness.

FIG. 4 illustrates an example method 400 for confining a ballast sample. Method 400 begins at step 405. At step 410, a railway environment location for collecting the ballast sample is determined. For example, a user associated with system 100 of FIG. 1 may determine a location within a railway environment (e.g., railway environment 110 of FIG. 1) to collect the ballast sample. The user may be an operator of a railway locomotive, a person who designs, builds, and/or maintains railways, a railway official, and the like. The location may be determined based on data (e.g., images, environmental conditions, traffic exposure, and the like) collected from the railway environment. Method 400 then moves from step 410 to step 415.

At step 415, a heavy-duty vehicle, a post driving tool, and a sample confinement tool (e.g., heavy-duty vehicle 120, post driving tool 130, and sample confinement tool 140 of FIG. 1) are positioned at the railway environment location. For example, an operator (e.g., operator 122 of FIG. 1) may drive the heavy-duty vehicle 120 to the railway environment location. The operator may attach the driving tool to the heavy-duty vehicle and/or the sample confinement tool to the driving tool before or after arriving at the railway environment location. Method 400 then moves from step 415 to step 420.

At step 420, a ballast sample location for collecting the ballast sample is determined. For example, an engineer may determine the ballast sample location based on data (e.g., images, environmental conditions, traffic exposure, and the like) associated with the railway environment. In certain embodiments, the ballast sample location is between two railroad ties (e.g., railroad ties 114 of FIG. 1). Method 400 then moves from step 420 to step 425, where the sample confinement tool is positioned above the ballast sample location. For example, the operator of the heavy-duty vehicle may maneuver the arm (e.g., arm 121 of FIG. 1) of the heavy-duty vehicle until the sample confinement tool is positioned longitudinally (e.g., perpendicular to the surface of the ballast) above the ballast sample location. Method 400 then moves from step 425 to step 430.

At step 430, an end (e.g., second end 144 of FIG. 1) of the sample confinement tool is inserted below a ballast surface at the ballast sample location. For example, the operator of the heavy-duty vehicle may activate the driving tool to exert a downward force on the sample confinement tool, which drives the end of the sample confinement tool below the ballast surface. In certain embodiments, the force exerted on the ballast surface includes a vibratory component. Method 400 then moves from step 430 to step 435.

At step 435, method 400 determines whether the end of the sample confinement tool is located a predetermined depth below the ballast surface. For example, the operator of the heavy-duty vehicle may visually inspect the sample confinement tool to determine whether the end of the sample confinement tool is located the predetermined depth (e.g., eighteen inches) below the ballast surface. As another example, a controller (e.g., controller 126 of FIG. 1) may automatically determine whether the end of the sample confinement tool is located a predetermined depth below the ballast surface. If the end of the sample confinement tool is not the predetermined depth below the ballast surface, method 400 moves from step 435 back to step 430, where the depth of the end of the sample confinement tool relative to the ballast surface is adjusted. For example, if the end of the sample confinement tool is less than the predetermined depth below the ballast surface, the sample confinement tool is inserted further below the ballast surface. As another example, if the end of the sample confinement tool is greater than the predetermined depth below the ballast surface, the sample confinement tool is retracted away from the ballast surface. Once the end of the sample confinement tool is determined to be at the predetermined depth below the ballast surface, method 400 moves from step 435 to step 440.

At step 440, a ballast sample is collected within the second end of the sample confinement tool. Due to the geometry of the sample confinement tool, the ballast sample is collected within the hollow core of the end of the sample confinement tool. The outer walls of the sample confinement tool separate the ballast sample from the surrounding ballast, which may help prevent contamination of the ballast sample. Method 400 then moves from step 440 to step 445.

At step 445, the ballast sample is confined within the second end of the sample confinement tool by mechanically compressing the ballast sample. For example, an operator of the heavy-duty vehicle may activate a hydraulic actuator (e.g., hydraulic actuator 240 of FIG. 2) of the sample confinement tool, which closes the jaw-like members (e.g., first member 210 and second member 220 of FIG. 2) of the sample confinement tool, thereby confining the ballast sample within the end of the sample confinement tool. Method 400 then moves from step 445 to step 450.

At step 450, the sample confinement tool is retracted from the ballast surface. For example, an operator of the heavy-duty vehicle may maneuver the arm of the heavy-duty vehicle to lift the sample confinement tool away from the ballast surface. Method 400 then moves from step 450 to step 455, where the sample confinement tool is positioned over a sample receptacle (e.g., sample receptacle 150 of FIG. 1). For example, the operator of the heavy-duty vehicle may maneuver the arm of the heavy-duty vehicle until the sample confinement tool is positioned above the sample receptacle. Method 400 then moves from step 455 to step 460.

At step 460, the ballast sample is released into the sample receptacle by mechanically decompressing the ballast sample. For example, the operator of the heavy-duty vehicle may deactivate the hydraulic actuator of the sample confinement tool, which opens the jaw-like members of the sample confinement tool, thereby releasing the ballast sample from the end of the sample confinement tool. Method 400 then moves from step 460 to step 465, where method 400 ends.

Modifications, additions, or omissions may be made to method 400 depicted in FIG. 4. Method 400 may include more, fewer, or other steps. For example, method 400 may include adjusting the hydraulic pressure of the hydraulic actuator based on the type of ballast. Steps may be performed in parallel or in any suitable order. While discussed as specific components completing the steps of method 400, any suitable component may perform any step of method 400.

FIG. 5 shows an example computer system that may be used by the systems and methods described herein. For example, one or more components (e.g., controller 126) of system 100 of FIG. 1 may include one or more interface(s) 510, processing circuitry 520, memory(ies) 530, and/or other suitable element(s). Interface 510 (receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD) database and/or network storage (for example, a server), and/or other computer-readable medium.

Although the systems and methods described herein are primarily directed to confining ballast samples within a railway environment, the system and methods described herein may be used to confine other types of samples within other types of environments. For example, the systems and methods described herein may be applied to samples that have a similar structure and/or consistency to ballast. As another example, the systems and methods described herein may be applied to other environments that utilize ballast such as roadways, underground retention systems, filter dams, containment berms, and the like.

Herein, a computer-readable non-transitory storage medium or media may include one or more semiconductor-based or other integrated circuits (IC) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A sample confinement tool, comprising:
   a first member comprising:
      a first end coupled to a driving tool, the driving tool coupled to a heavy-duty vehicle; and
      a C-shaped second end opposite the first end;
   a second member mechanically coupled to the first member by a fastener, the second member configured to move relative to the first member by pivoting about an axis of the fastener, the second member comprising a C-shaped end that overlaps the C-shaped second end of the first member, thereby forming an end of the sample confinement tool; and
   a hydraulic actuator operably configured to control the movement of the second member relative to the first member,
   wherein the sample confinement tool is operable to:
      insert a predetermined depth below a ballast surface,
      collect a ballast sample within the end of the sample confinement tool, and
      confine the ballast sample within the end of the sample confinement tool by mechanically compressing the ballast sample.

2. The sample confinement tool of claim 1, wherein a portion of the second member overlaps at least a portion of the first member.

3. The sample confinement tool of claim 2, wherein the hydraulic actuator is operable to:
   rotate the second member in a first direction relative to the first member to mechanically compress the ballast sample; and
   rotate the second member in a second direction relative to the first member to mechanically decompress the ballast sample.

4. The sample confinement tool of claim 1, wherein the sample confinement tool is a hollow square tube that is approximately four feet in length, approximately eight inches in depth, and approximately eight inches in width.

5. The sample confinement tool of claim 1, wherein:
   the sample confinement tool is coupled to one or more hydraulic lines; and
   the one or more hydraulic lines are coupled to a hydraulic circuit of the heavy-duty vehicle.

6. The sample confinement tool of claim 1, further operable to vibrate, using the driving tool, until the end of the sample confinement tool reaches the predetermined depth below the ballast surface.

7. The sample confinement tool of claim 1, wherein:
   the heavy-duty vehicle is a backhoe,
   the driving tool is a vibrating tool, and
   the ballast surface is a bed of a railroad track.

8. An apparatus, comprising:
   a first end;
   a second end;
   a first member comprising a first C-shaped end;
   a second member coupled to the first member by a fastener, the second member configured to move relative to the first member by pivoting about an axis of the fastener, the second member comprising a second C-shaped end that overlaps the first C-shaped end of the first member, thereby forming the second end of the apparatus; and
   a controller configured to receive a location of the second end of the apparatus,
   wherein the apparatus is operable to:
      insert a predetermined depth below a ballast surface,
      collect a ballast sample within the second end of the apparatus, and
      release the ballast sample into a sample receptacle by mechanically decompressing the ballast sample.

9. The apparatus of claim 8, further comprising a hydraulic actuator.

10. The apparatus of claim 9, wherein the hydraulic actuator is operable to:
    rotate the second member in a first direction relative to the first member to mechanically compress the ballast sample; and
    rotate the second member in a second direction relative to the first member to mechanically decompress the ballast sample.

11. The apparatus of claim 8, wherein the apparatus is a hollow square tube that is approximately four feet in length, approximately eight inches in depth, and approximately eight inches in width.

12. The apparatus of claim 8, wherein:
    the apparatus is coupled to one or more hydraulic lines; and
    the one or more hydraulic lines are coupled to a hydraulic circuit of a heavy-duty vehicle.

13. The apparatus of claim 8, wherein the apparatus is further operable to vibrate until the second end of the apparatus reaches the predetermined depth below the ballast surface.

14. The apparatus of claim 8, wherein the first end is coupled to a driving tool and the ballast surface is a bed of a railroad track.

15. A method, comprising:
    inserting an end of a sample confinement tool a predetermined depth below a ballast surface, the sample confinement tool comprising:
       a first member having a first end and a C-shaped second end;
       a second member coupled to the first member by a fastener, the second member configured to move relative to the first member by pivoting about an axis of the fastener, the second member comprising a C-shaped end that overlaps the C-shaped second end of the first member, thereby forming the end of the sample confinement tool;
    confining a ballast sample within the end of the sample confinement tool by mechanically compressing the ballast sample;
    releasing the ballast sample by mechanically decompressing the ballast sample.

16. The method of claim 15, the sample confinement tool further comprising a hydraulic actuator.

17. The method of claim 16, further comprising:
rotating, using the hydraulic actuator, the second member in a first direction relative to the first member to mechanically compress the ballast sample; and
rotating, using the hydraulic actuator, the second member in a second direction relative to the first member to mechanically decompress the ballast sample.

18. The method of claim 15, wherein the sample confinement tool is a hollow square tube approximately four feet in length, approximately eight inches in depth, and approximately eight inches in width.

19. The method of claim 15, further comprising coupling one or more hydraulic lines to the sample confinement tool and to a hydraulic circuit of a heavy-duty vehicle.

20. The method of claim 15, further comprising vibrating, using a driving tool, the sample confinement tool until the end of the sample confinement tool reaches the predetermined depth below the ballast surface.

* * * * *